(12) United States Patent
Shaw et al.

(10) Patent No.: US 7,147,006 B2
(45) Date of Patent: Dec. 12, 2006

(54) PILOT OPERATED VALVE

(75) Inventors: Edward Gilbert Shaw, Worcestershire (GB); Laurence John Potter, Birmingham (GB)

(73) Assignee: Haldex Brake Products, Ltd. (GB)

( * ) Notice: Subject to any disclaimer, the term of this patent is extended or adjusted under 35 U.S.C. 154(b) by 0 days.

(21) Appl. No.: 10/822,598

(22) Filed: Apr. 12, 2004

(65) Prior Publication Data

US 2005/0087243 A1  Apr. 28, 2005

(51) Int. Cl.
  *F16K 31/42* (2006.01)
  *F15B 13/043* (2006.01)
(52) U.S. Cl. ............... 137/627.5; 137/596.16
(58) Field of Classification Search ............. 137/627.5, 137/596.16
  See application file for complete search history.

(56) References Cited

U.S. PATENT DOCUMENTS

| | | | |
|---|---|---|---|
| 3,194,266 A | 7/1965 | Abbott | |
| 3,814,134 A | 6/1974 | Vanti | 137/627.5 |
| 3,921,666 A * | 11/1975 | Leiber | 137/627.5 |
| 4,068,902 A * | 1/1978 | Deem et al. | 137/627.5 |
| 4,561,464 A * | 12/1985 | Frantz | 137/627.5 |
| 4,617,952 A * | 10/1986 | Fujiwara et al. | 137/596.17 |
| 5,538,336 A | 7/1996 | Reuter et al. | |
| 5,782,267 A | 7/1998 | Yoo | |
| 6,220,295 B1 | 4/2001 | Bouchard | 137/625.44 |
| 6,637,462 B1 * | 10/2003 | Foster et al. | 137/627.5 |

FOREIGN PATENT DOCUMENTS

| | | |
|---|---|---|
| DE | 762584 C | 1/1953 |
| DE | 32 40 277 | 5/1984 |
| DE | 3608550 A | 9/1987 |
| FR | 2444212 A | 7/1980 |
| WO | WO 92/16400 | 10/1992 |

OTHER PUBLICATIONS

International Search Report, Jan. 22, 2003.

* cited by examiner

*Primary Examiner*—Ramesh Krishnamurthy
(74) *Attorney, Agent, or Firm*—St. Onge Steward Johnston & Reens LLC

(57) ABSTRACT

A valve assembly having a fluid switch and a main valve for controlling fluid pressure in a working volume in three control states wherein the main valve has three ports for fluid, flow of fluid through a first port and a second port being controlled by the fluid switch being provided with an electrical signal in a first state or a second state respectively, and flow of fluid through the third port being controlled by alternating the signal, preferably rapidly, between the first and second states.

26 Claims, 7 Drawing Sheets

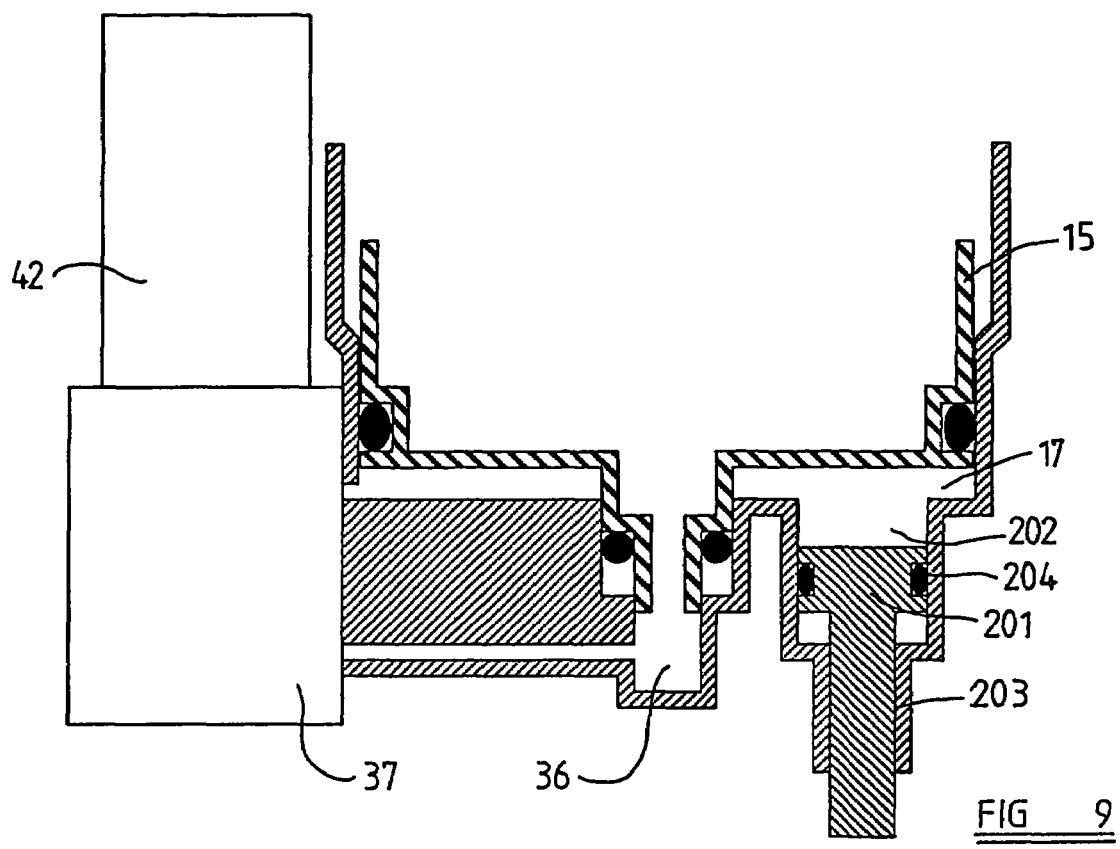
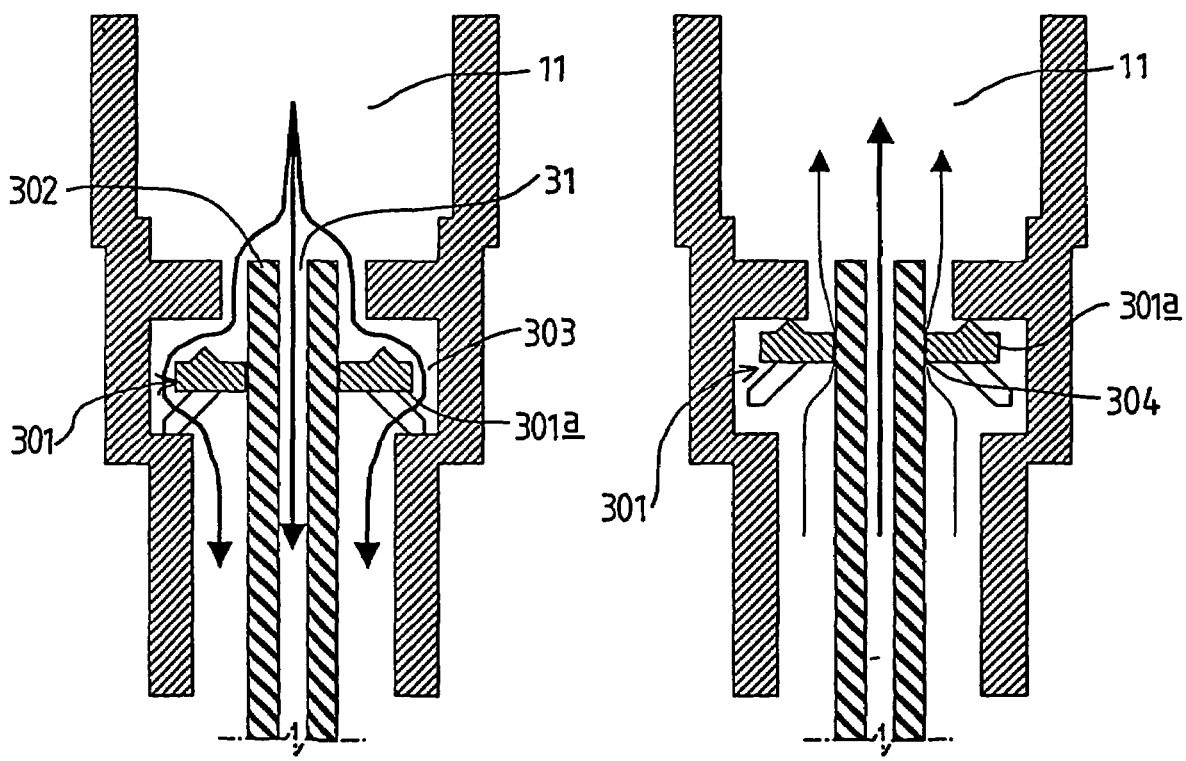

PILOT OPERATED VALVE

BACKGROUND OF THE INVENTION

This invention relates to a fluid switch having three ports and electrical switch means for controlling flow of fluid through said ports. The invention also relates to a valve assembly having electrical means for controlling the fluid pressure relative to a working volume in three control states. The control states may apply, hold or release fluid pressure relative to the working volume.

The fluid switch may be used in connection with any suitable application such as a fluid valve or for applications other than valves, for example pistons.

The valve assembly may be an ABS valve in the brake system of a vehicle in which the control states may apply, hold or release fluid pressure from the working volume which, in this case, comprises a vehicle brake.

Objects of the invention are to provide a new and improved fluid switch and a new and improved valve assembly, and in particular is more economical than an existing valve assembly.

SUMMARY OF THE INVENTION

According to one aspect of the invention we provide a fluid switch giving three outputs from a three port, two position structure, actuated by an electrical supply which may be high or low to provide two of said outputs or switched rapidly therebetween to provide the third output.

The fluid may be pneumatic fluid.

The fluid may be hydraulic fluid.

The fluid switch may be a solenoid valve.

Alternatively, the fluid switch may be a piezoelectric valve.

Said structure may comprise a switch member moveable by a control means to control flow of fluid through said ports.

The switch member may be moveable by said control means to allow flow through one port and prevent flow through a second port where the control means is in a first state and to prevent flow through the one port and allow flow through the second port where the control means is in a second state and to allow flow through a third port where said control means is alternated between said states.

Preferably the control means is rapidly alternated between said states.

The present invention allows three control states to be achieved using a single switch member driven by a single electrical channel. This offers a simplified switch or valve compared with switches or valves requiring a plurality of switch or valve members operated, for example, by an associated solenoid as it offers lower switch or valve cost and lower electronic control unit cost because fewer output drivers are required, as well as lower cabling cost because there is a reduction in the number of connections required. A single electrical switch may also consume less electrical power than a switch with multiple electrical switches.

According to another aspect of the present invention we provide a valve assembly having a fluid switch and a main valve for controlling fluid pressure in a working volume in three control states wherein the main valve has three ports for fluid, flow of fluid through a first port and a second port being controlled by the fluid switch being provided with an electrical signal in a first state or a second state respectively, and flow of fluid through the third port being controlled by alternating said signal, preferably rapidly, between said first and second states.

The fluid may be pneumatic fluid.

The fluid may be hydraulic fluid.

The electrical switch means may comprise a two—position solenoid operated valve member.

Alternatively the electrical switch may comprise a two position piezoelectrically operated valve member.

The valve assembly may be an ABS valve.

The valve assembly may be an EBS valve.

The pressure supply to the fluid switch may be drawn from the pressure supply to the main valve thereby making the flow into the control chamber related to the supply pressure, for example, approximately proportional to the supply pressure.

A build state may be set when the electrical signal is off for a continuous period.

A dump state may be set when the electrical signal is on for a continuous period.

A hold state may be set when the electrical signal is alternated, preferably rapidly, between on and off such that the pressure in the control chamber, of the valve remains within an intermediate range.

The valve may be provided with ABS pressure control logic to control the fluid switch.

The hereinbefore described valves may be provided with operating parts having effective areas which provide characteristics, with respect to supply and delivery pressures, which compensate for the non-uniform proportion of supply pressure delivered by the fluid switch when the electrical signal applied thereto has a constant high/low ratio and voltage.

Said characteristics may be arranged to give a substantially proportional constant step build response across the range of operating pressures when a predetermined sequence of electrical signals is applied to the fluid switch.

An ABS valve has a normally open hold seat for preventing pressure rise in a delivery to a brake operating means when the hold seat is closed and a normally open exhaust seat for connecting the delivery to atmosphere or other low pressure region when the exhaust seat is open.

Such seats enable an ABS valve to have three operating states, namely,

1. A pressure build state in which the hold seat is open and the exhaust seat is closed. This enables free flow of fluid from a supply to the delivery and from the delivery to the supply.

2. A pressure hold state in which the hold seat is closed and the exhaust seat is also closed. In consequence no flow between the supply and the delivery occurs but, preferably, flow occurs from delivery to supply if the supply is at a lower pressure than the delivery.

3. A pressure exhaust state in which the hold seat is closed and the exhaust seat is open. No flow occurs from supply to delivery but flow occurs from delivery to atmosphere.

In addition to these three basic states a slow build condition is normally required which can be achieved by alternating the operating state between the hold and build states.

When the valve is an ABS valve the three control states may comprise a build, hold and exhaust state.

The build pressure state may be when the solenoid is de-energised for a continuous period and the pressure in the control volume is less than a predetermined percentage of the supply pressure. Said predetermined pressure may lie in the range 5% to 50% and is preferably 20%.

The exhaust pressure state may be when the solenoid is energised continuously and the pressure in the control volume is greater than a predetermined percentage of the supply pressure. Said predetermined pressure may lie in the range 70% to 95% and is preferably 80%.

The hold pressure state may be when the solenoid is switched on and off rapidly such that the pressure delivered from the solenoid is about 10% to 90% of the supply pressure and preferably about 50%.

According to another aspect of the invention we provide a valve assembly having an electrically operated fluid switch control device having two seats and a switch member movable alternatively into sealing engagement with the seats to connect a control chamber of a main valve to a supply of fluid under pressure when the switch member is in a first position and in engagement with one seat and to a low pressure region when the switch member is in a second position and in engagement with the other seat, a body of the main valve having a first chamber in which a first piston is mounted for movement under the influence of fluid pressure in the control chamber, a second piston movable in a second chamber provided in the first piston under the influence of fluid pressure in a supply port, the second piston being movable into engagement with a third seat provided on the first piston to control passage of fluid from a delivery to an exhaust and being movable into engagement with a fourth seat provided on said body to control passage of fluid from a supply to the delivery and a control means to energise the fluid switch to position said switch member
 a. in said first position
 b. in said second position
 c. to alternate the position of the valve member between said first and second positions.

The internal dimensions of the valve are such that the valve enters each of the three control states depending upon the proportion of the supply pressure which is passed to the control volume.

By "rapidly" in this specification we mean switched on and off in the range 25 to 100 cycles per second (cps) and preferably 50 cps.

The invention permits the above mentioned states to apply over a wide range of supply pressure. By appropriate selection of the effective areas the hold state can be maintained over a wide range of control ratio, i.e. control pressure/supply pressure, but still allowing the pressure build and pressure exhaust state to be reached under any circumstances within the operating range of supply pressure. In this specification the operating range of supply pressure means 0 to 10 bar but full operation of the valve may not be available when the supply pressure is below about 1 bar.

An adjustment device may be providing for adjusting the volume of the control chamber.

The adjustment device may comprise an adjuster piston moveable in an adjuster chamber which is connected to the control chamber whereby the volume of the control chamber may be adjusted by movement of the adjuster piston in the adjuster chamber.

A device may be provided to accentuate a difference in pressure across the second piston.

The device may comprise a shuttle valve connected in functional association with a supply port to permit of a greater flow of fluid into the supply port than out of the supply port.

The shuttle valve may have a valve member which, when the flow is into the supply port, occupies a position in which fluid may flow around the outside of the valve member whilst, when the flow is out of the supply port, the valve member occupies a position in which flow of fluid around the outside of the valve member is restricted or prevented.

BRIEF DESCRIPTION OF THE DRAWINGS

Three embodiments of the invention will now be described by way of example with reference to the accompanying drawings wherein:

FIG. 9 is a diagrammatic fragmentary illustration of the valve of FIGS. 7 and 8, and FIGS. 10 and 11 are fragmentary diagrammatic illustrations of another part of the valve shown in FIGS. 7 and 8.

DETAILED DESCRIPTION OF EXEMPLARY EMBODIMENTS OF THE INVENTION

Figure 1:
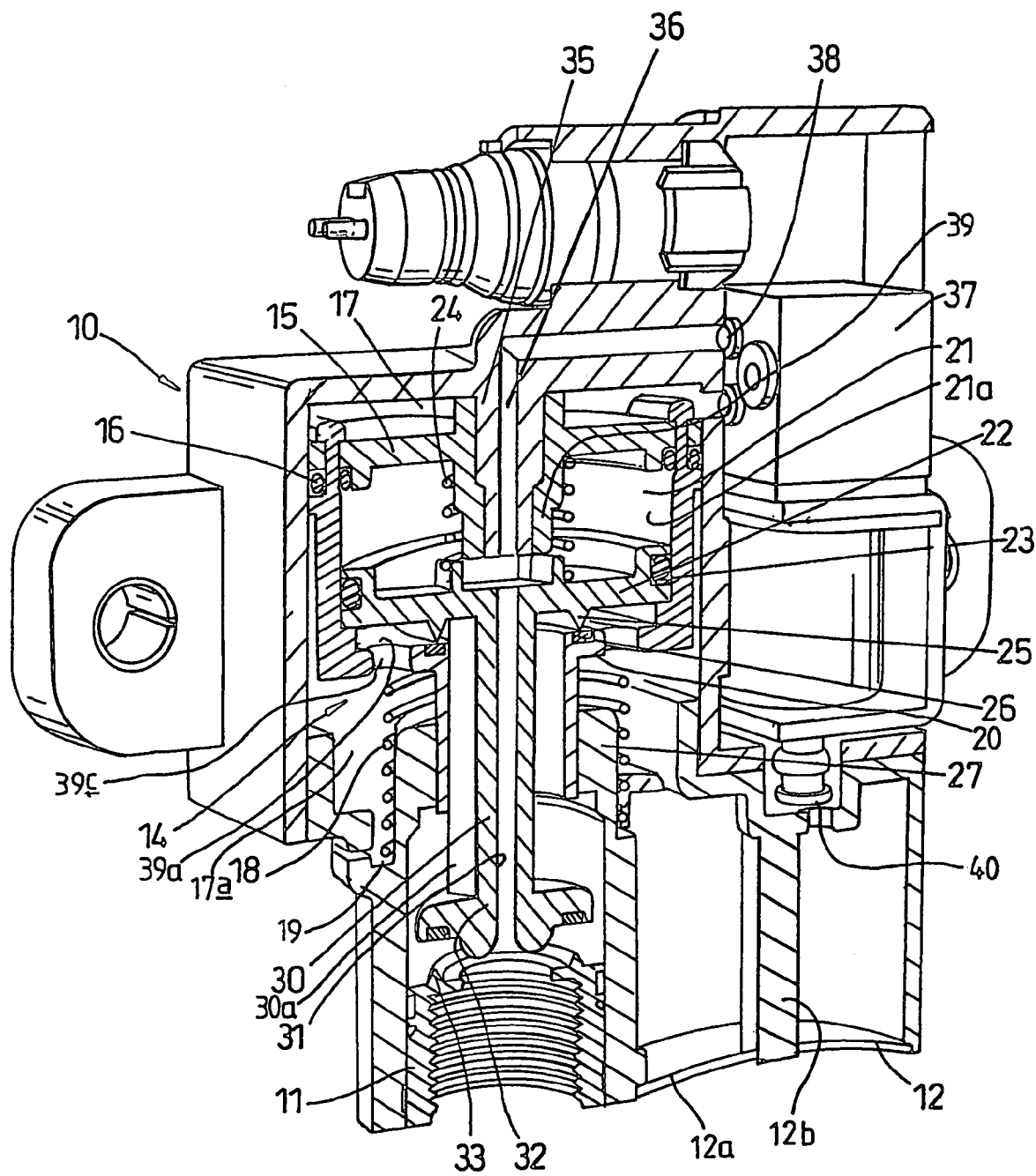
FIG. 1 is a broken away perspective view of a valve embodying the invention.
Figure 1A:
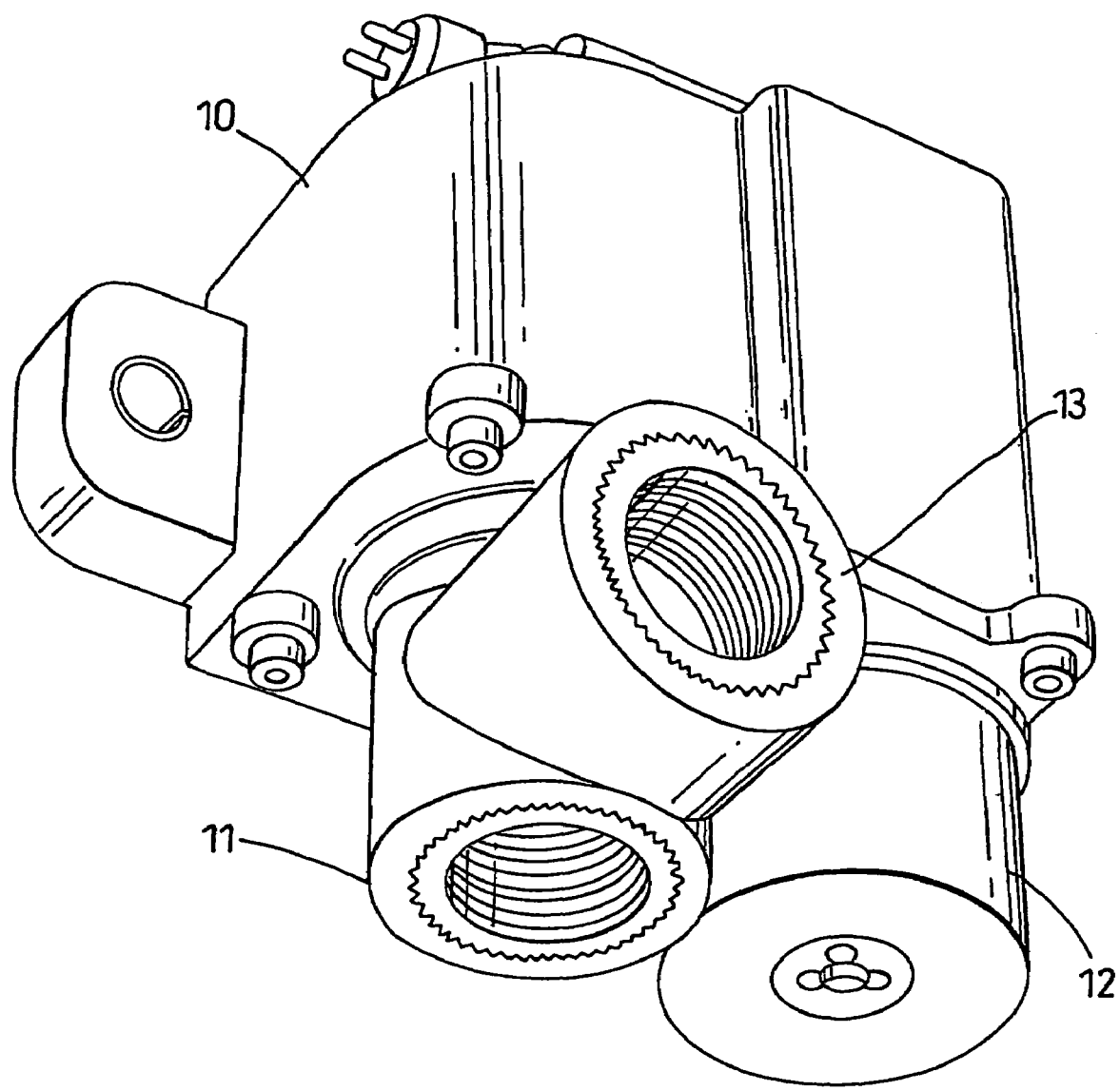
FIG. 1a is a perspective view of the valve of FIG. 1.

Referring now to FIG. 1, a valve assembly comprises a main valve in a body 10 having a supply port 11 for connection to a supply of fluid under pressure such as compressed air supplied from the brake control of the vehicle. The body 10 also has an exhaust port 12 whereby fluid under pressure may be exhausted to atmosphere or another low pressure region (in which the pressure is lower than that in the supply) and preferably is at or about at atmospheric pressure. The exhaust port 12 is protected from ingress of dirt by a rubber flap 12a supported by a stem 12b. The body 10 also has a delivery port 13 which extends at right angles to the supply port 11 as best shown in FIG. 1a.

Within the body 10 is a first chamber 14 in which a first piston 15 is slidably mounted with an o-ring seal 16 provided between the piston 15 and a cylindrical wall of the chamber 14. The region of the chamber 14 above the piston 15 is indicated at 17 and comprises a control chamber as hereinafter described. The region beneath the piston 15 is indicated at 17a and communicates with exhaust.

A coil compression spring 18 is disposed between a bottom wall 19 of the chamber 14 and a shoulder 20 of the piston 15 to ensure that the piston 15 returns when there is no supply pressure.

A second chamber 21 is provided within the first piston 15 and houses a second piston 22 which is in sealing engagement through an o-ring seal 23 with a cylindrical wall 21a of the chamber 21. A coil compression spring 24 is provided to act between the first and second pistons 15 and 22 so as to urge the piston 22 downwardly relative to the piston 15 in FIG. 1 to ensure that the pistons return when there is no supply pressure. The second piston 22 is provided with a formation 25 for engagement with a third or dump seat 26 provided on the first piston 15 so as to control passage of fluid through a sleeve part 27 of the piston 15 and thus controls passage of fluid under pressure from the delivery port 13 to the exhaust port 12. A lower part 39a of the chamber 21 is connected by holes 39c to the chamber 17a.

The second piston 22 is provided with a tubular downwardly extending part 30 which has a central bore 31 and a formation 32 for sealing engagement with a fourth hold seat 33 provided on the body 10 so as to control passage of fluid under pressure from supply port 11 to delivery port 13. As shown in FIG. 1 the formation 32 maybe a resilient seal element and the seat 33 may be a triangular section ring. Alternatively, as shown in FIGS. 2–5 the formation 32 may be a rigid formation and the seat 33 may be a resilient seal element. The part 30 has a web 30a for guiding engagement with the sleeve part 27.

At its upper end the body 10 is provided with a downwardly extending tubular part 35 which is provided with a central bore 36 which extends to a fluid switch which in this example comprises a solenoid valve 37. The solenoid valve 37 has one seat 38 to permit passage of air under pressure from an upper part 39 of the chamber 21 which is above the piston 22 and which is in communication with the supply port 11 through the bore 31 and another seat 40 which controls admission of fluid past seat 40 which is controlled by an solenoid operable valve member 41 which, when a solenoid 42 is de-energised causes the seat 38 to be closed and the seat 40 to be opened whilst when the solenoid 42 is energised the reverse occurs so that the port 38 is opened and the port 40 is closed.

Figure 2:
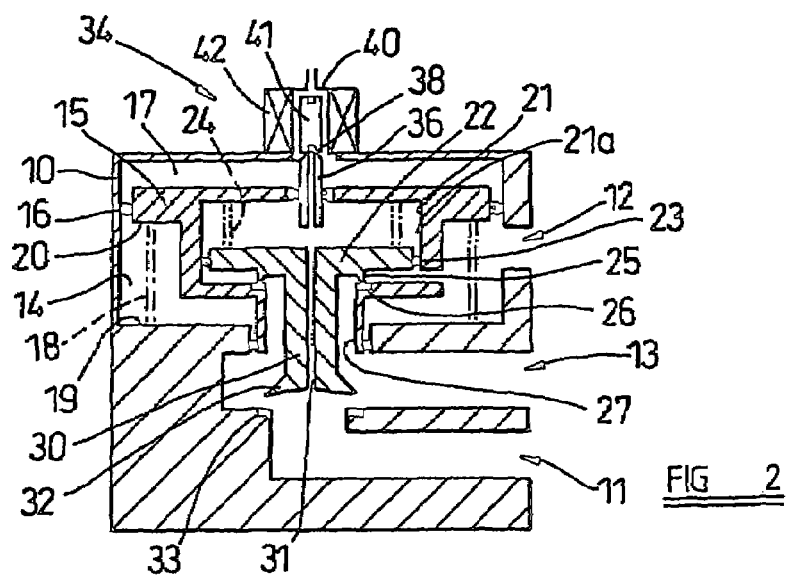
FIG. 2 is a diagrammatic illustration of the valve of FIG. 1 when in a pressure build condition.

In use, when the solenoid 42 is de-energised for a continuous period of for example >30 ms and the pressure in the control chamber 17 is less than, for example, 20% of the pressure in the supply port 11 then the components of the valve occupy the position shown in FIG. 2 so that the hold seat 33 is open and the exhaust seat 26 is closed and therefore there is free flow of the supply from the supply port 11 to the delivery port 13 and vice versa.

Figure 3:
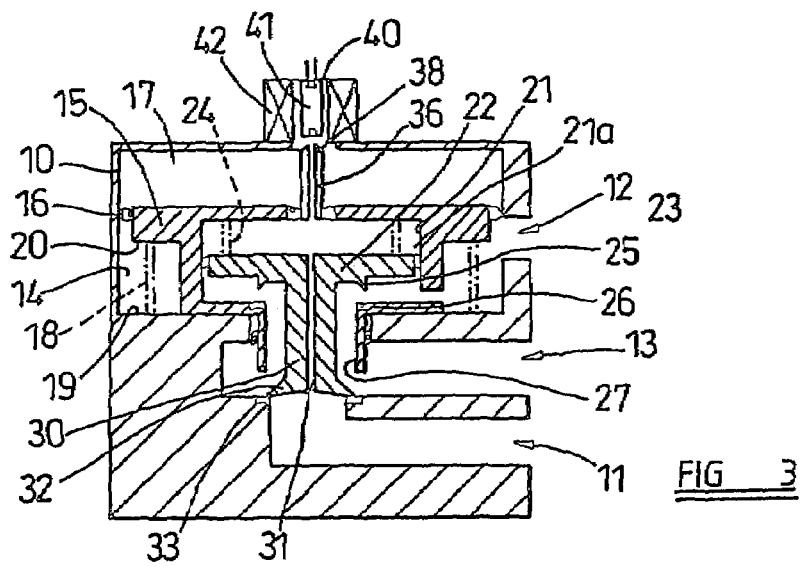
FIG. 3 is diagrammatic illustration of the valve of FIG. 1 when in a pressure exhaust condition.

When the solenoid 42 is continuously energised and the pressure in the control chamber 17 is greater than say 80% of the pressure in the supply port 11 the components of the valve adopt the positions shown in FIG. 3 and so the delivery port is connected to the exhaust port.

Figure 4:
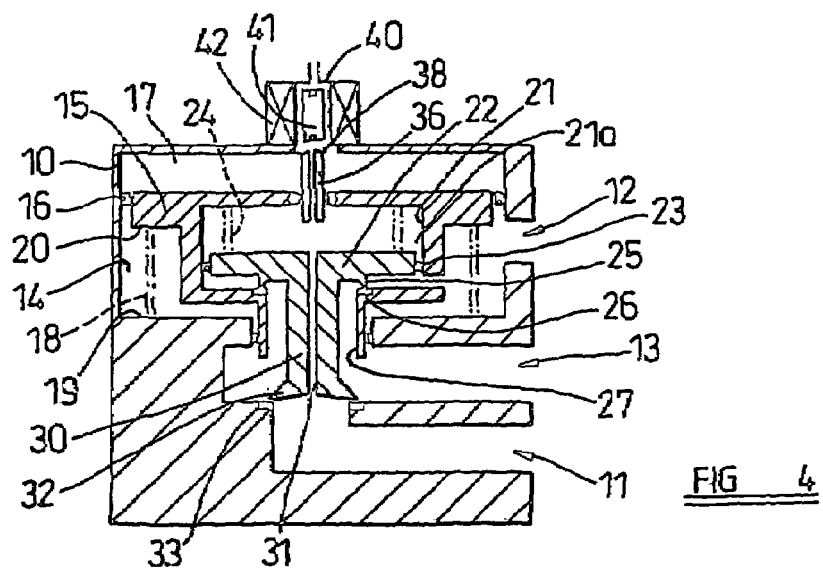
FIG. 4 is a diagrammatic illustration of the valve in FIG. 1 when in a pressure hold condition.
Figure 5:
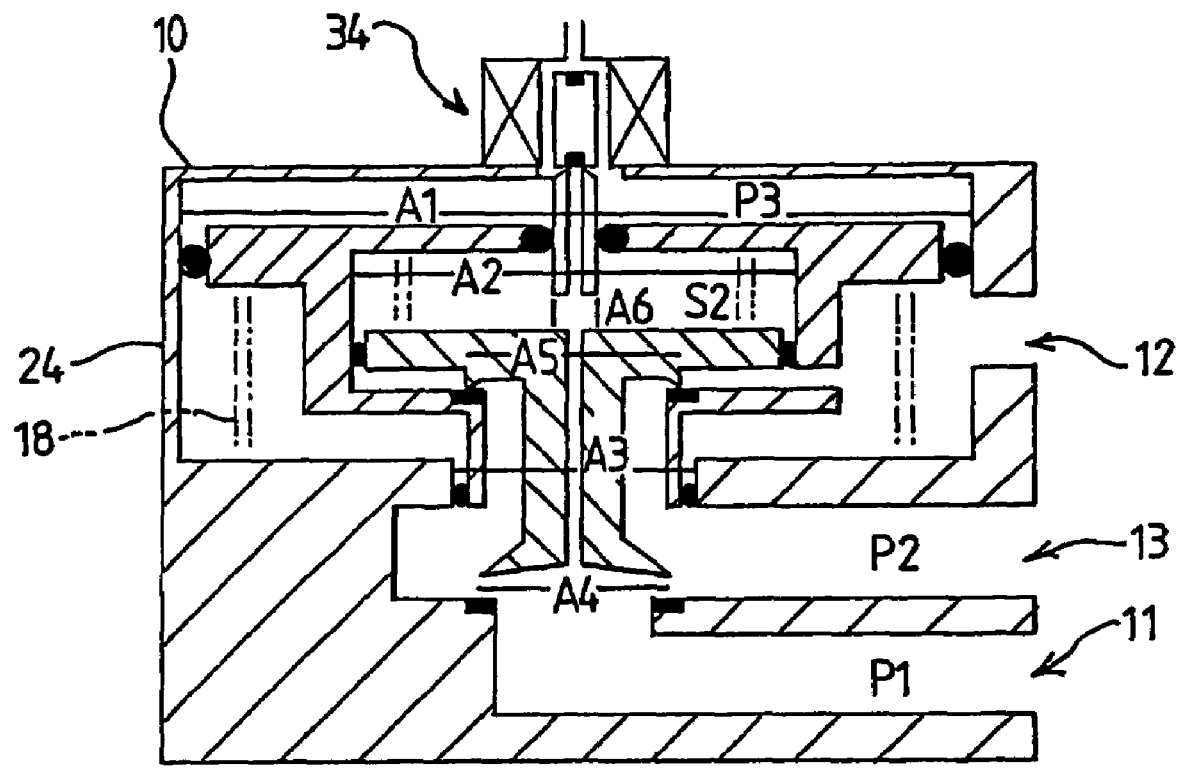
FIG. 5 is a view similar to that of FIGS. 2 to 4, but annotated with areas of relevant ports.

When the solenoid 42 is switched on and off rapidly for example 50 cycles per second (cps) and typically in the range 25 cps to 100 cps this results in the pressure being delivered from the solenoid valve to the chamber 17 being about 50% of the supply port pressure. As a result the valve components adopt the position as shown in FIG. 4 and so the delivery port is isolated from both the exhaust port 12 and the supply port 11.

These states can apply over a wide range of supply pressures.

By careful selection of relative areas the hold state can be maintained over a wide range of control percentage, eg. 20% to 80%, but still allowing the build and dump states to be reached under any circumstances within the operating range.

The solenoid valve 37 is designed such that the mass flow rate through the exhaust port from a given pressure in the control chamber 17 is approximately equal to the mass flow through the solenoid inlet port 40 from double the control chamber pressure. This should mean that when the solenoid is switched one way and then the other for equal periods the pressure in the control chamber 40 averages at about half of the supply pressure. Unfortunately, the physical type of flow through an orifice changes depending on pressure ratio. Consequently, the average pressure will tend to be a lower proportion of the supply pressure when the supply pressure is near the bottom of its range than it is when the supply pressure is near the top of its range. The range of supply pressures for truck air brake ABS is about 0 bar to 10 bar, but full operation of this valve may not be available when the supply pressure is below 1 bar.

The main valve in the body 10 has a normally open hold seat, and a normally closed exhaust seat. There may be some springs incorporated in the design, as in this example, but these are only to ensure that the primary and secondary pistons return to the required positions when there is no supply pressure. (Otherwise, springs impart characteristics that are probably undesirable for the ABS application.)

The primary piston has three effective areas that control its characteristics. Area A1 is exposed to the control pressure P3. Area A4 is the sealing area of the hold seat and is exposed to supply pressure P1. Its acts in opposition to A1. Area (A3–A4) is the effective area exposed to delivery pressure P2, and operates in opposition to A1. When the control pressure P3 is relatively low the supply pressure P1 on A4 and the delivery pressure P2 on (A3–A4) keeps the hold seat open. Supply pressure P1 also acts on (A2–A4) on the secondary piston opposed by P2 acting on (A5–A4) to provide a sealing load on the exhaust seat. When the hold seat is closed this force is shared between the hold seat and the exhaust seat.

When the solenoid is switched on the control pressure P3 rises towards the supply pressure P1. When the control pressure P3 reaches a level relative to the supply P1 and delivery P2 defined (neglecting springs, friction and minor areas such as A6) by:

$$(P3/P1)_{Hold} = A4/A1 + (P2/P1)*(A3-A4)/A1, \text{"Minimum Hold Point"}$$

the two pistons will start to move together to close the hold seat thereby stopping further rise of delivery pressure. When the hold seat is closed the pistons will stop moving. If the control pressure continues to rise when it reaches a level defined by:

$$(P3/P1)_{Dump} = A2/A1 + (P2/P1)*(A3-A5)/A1, \text{"Minimum Dump Point"}$$

the primary piston will start to move again but this time without the secondary piston (which is constrained by the hold seat) thereby opening the exhaust seat and releasing delivery pressure.

If the solenoid is switched on and off at an appropriate rate (depending on its flow capacity and the volume of the control chamber), the pressure in the control chamber can be maintained between the Minimum Hold Point and the Minimum Dump Point. The hold and exhaust seats remain closed thereby holding a constant pressure in the delivery.

A small step rise in the delivery pressure can be achieved by switching the solenoid off for a period sufficient to allow the control pressure to drop below the minimum hold point momentarily. An extended solenoid on period may in some circumstances help to return the piston to the hold position more rapidly than simply returning to the normal hold regime directly. In order to simplify the ABS control algorithm the time taken for the pressure in the control chamber to drop from the holding pressure to the minimum hold point must be predictable irrespective of the actual supply and delivery pressures. This is where the compensation for the non-linearity of the solenoid delivery comes in.

By inspection of the expressions for Minimum Hold Point and Minimum Dump Point it is apparent that it is not simple to arrange for the ratios of A4/A1 and A2/A1 to vary to provide compensation directly for different supply pressures. However, it is possible to adjust A3 such that the minimum hold point and the minimum dump point move higher at higher delivery pressure, thereby providing partial compensation. This should enable almost constant pressure steps during a slow build instead of the steps getting smaller (with constant build pulses) as P2 approaches P1.

If the supply pressure is removed whilst the valve is in its hold or dump states then the control pressure will also be released allowing the valve to return to its build state and releasing any delivery pressure.

Figure 6:
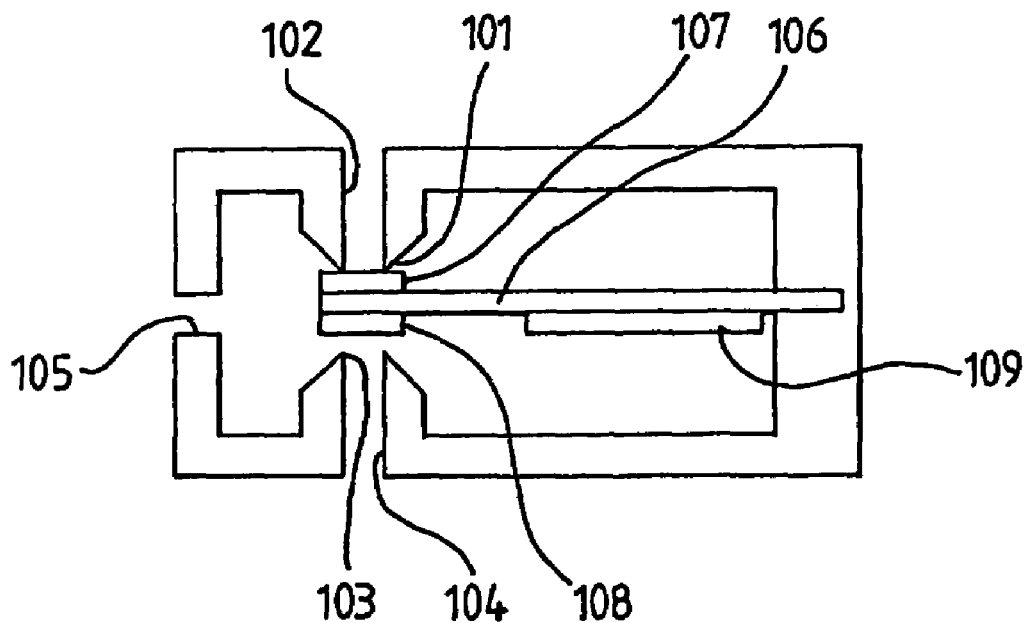
FIG. 6 is a diagrammatic illustration of a second embodiment comprising a piezoelectric fluid switch.
Figure 7:
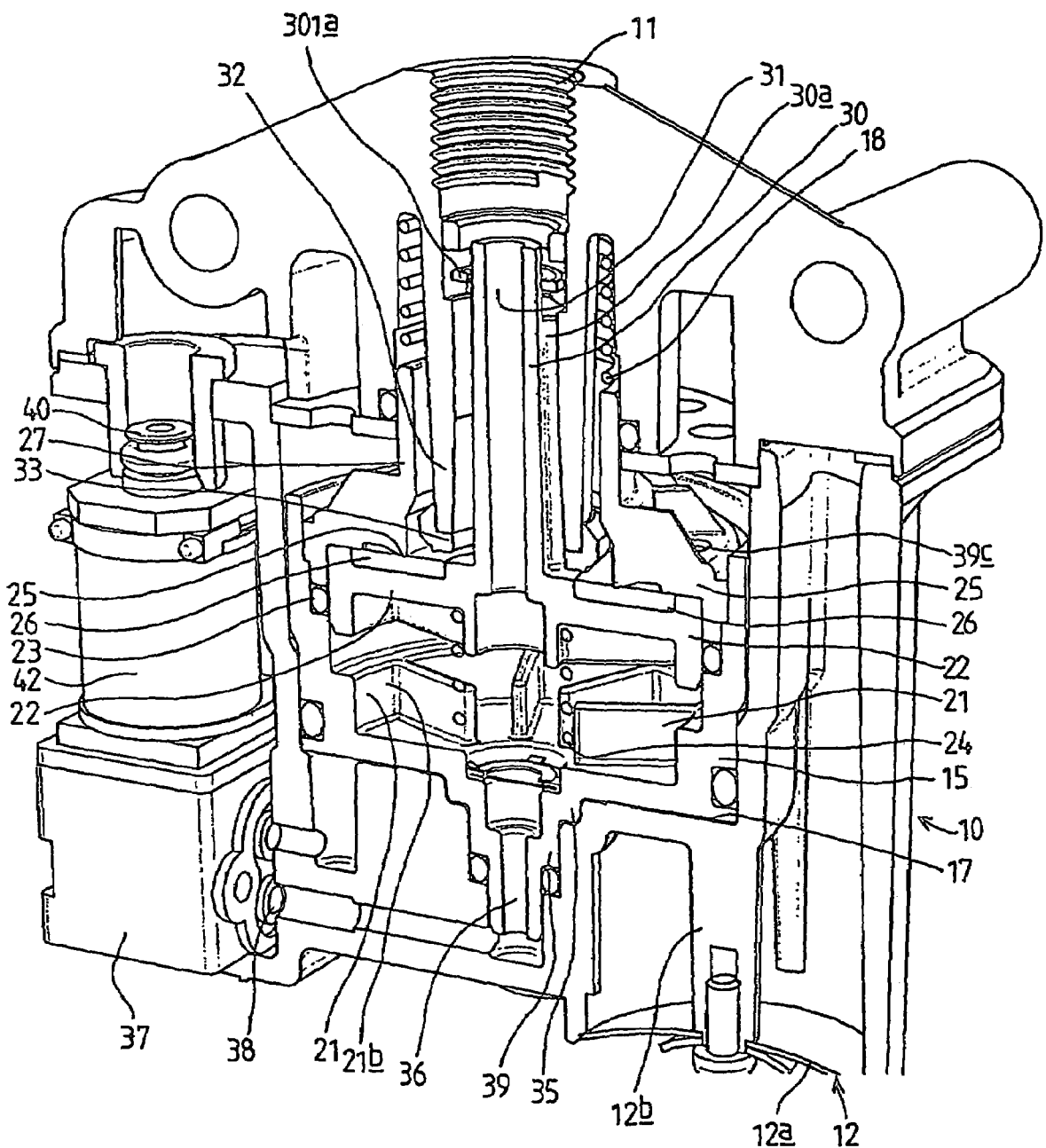
FIG. 7 is a broken away perspective view of a third valve embodying the invention.
Figure 8:
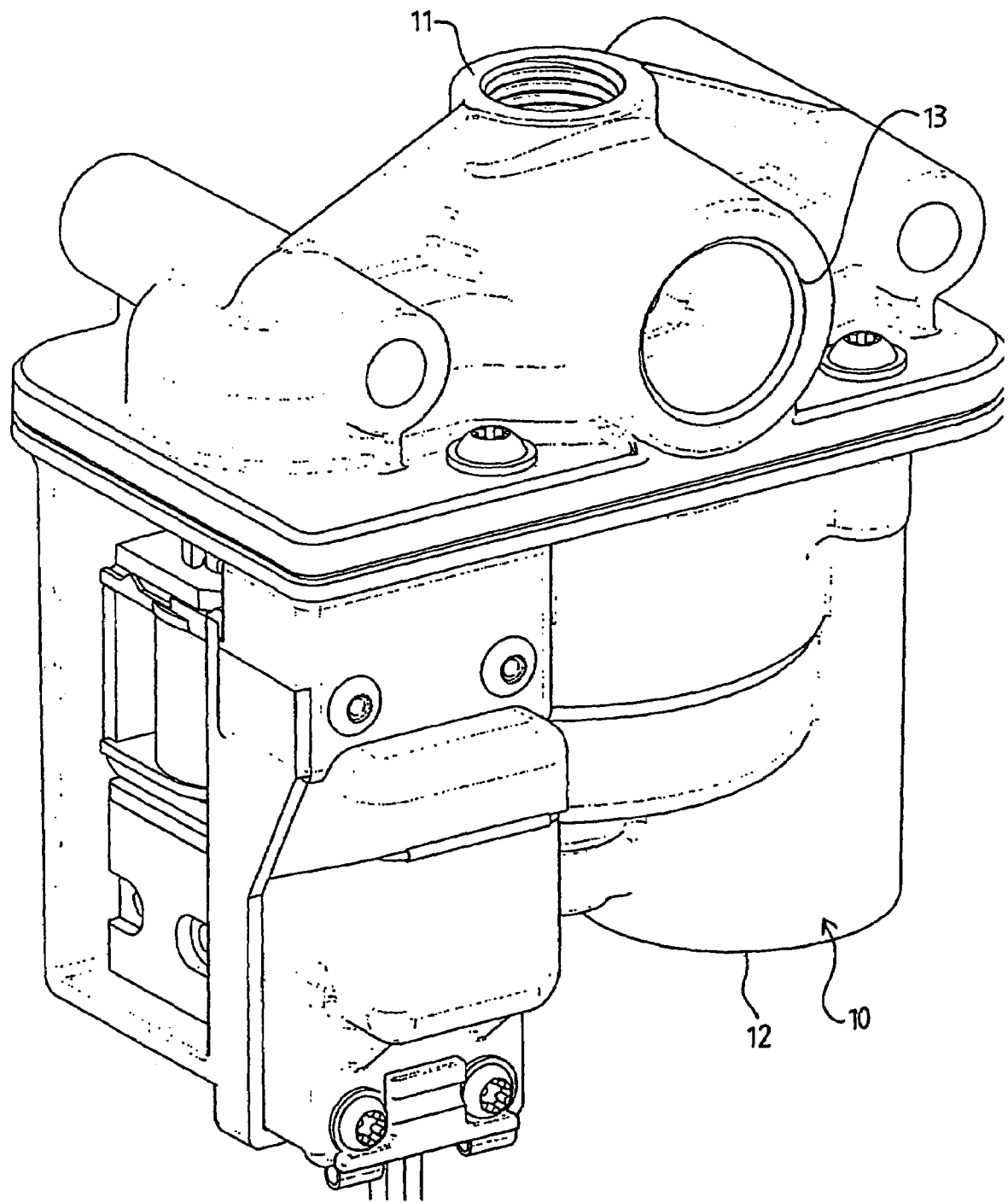
FIG. 8 is a perspective view of the valve of FIG. 7.

If desired, instead of the fluid switch being a solenoid valve as described hereinbefore, the fluid switch may comprise a piezoelectric valve which, as illustrated in FIG. 6, has a supply seat 101 which controls an air supply port 102, an exhaust seat 103 which controls an exhaust port 104, and a third port 105 which supplies air, in the present example, to the control chamber 17. The seats 101 and 102 are controllable by a valve member 106 provided with suitable valve seat engaging parts 107, 108. The valve 106 is moveable by a piezoelectric element 109 so as to cause engagement between the valve seat 101 and the valve member 107 or engagement between the valve seat 103 and the valve member 108.

Although in this example the electrical switch has been described as supplying air to a control chamber of an ABS valve it may, in an alternative embodiment, provide air to the control chamber of an EBS valve. An EBS valve may have the same structure as an ABS valve but is controlled in conventional manner, via the fluid switch, by electrical brake control logic.

Further alternately the fluid switch may be applied to systems, other than that described hereinbefore, and it may be applied to any desired fluid, whether hydraulic or pneumatic. In addition the fluid switch may be arranged to provide fluid to any suitable device which may not be a valve, for example, to a piston.

FIGS. 7 to 11 illustrate a third embodiment of the invention which is similar to that of the first embodiment and the same reference numerals have been used to refer to corresponding parts as were used in FIGS. 1 to 5. Furthermore the valve described with reference to FIGS. 7 to 11 operate in the same way as the valve of the first embodiment and thus further description of the common parts is not required. Hereafter, we describe only the additional features which are present in the third embodiment and which are not present in the first embodiment.

The volume of the control chamber 17 is important for the dynamic operation of the valve. If the volume is too large, the time taken for the valve to change from one state to another may be too long for satisfactory system performance. If the volume is too small then the control pressure variations in the hold state may allow the piston to cause leakage either from supply to delivery, or from delivery to exhausts, or both.

Under production conditions the volume may be incorrect due to dimensional tolerances on individual parts. The volume may be adjusted to correct for parts variation by providing a control volume adjuster. As shown in FIG. 9, which is taken on a different section than is FIG. 7, this comprises an adjuster piston 201 with a sliding seal 204 installed in a cylinder 202 or the like which is directly connected to the main control volume 17. The adjuster piston 201 is mounted on an adjusting mechanism such as a screw thread 203.

During the assembly process the dynamic response of the valve is measured by performing appropriate tests. According to the results of these tests the adjuster piston 201 is moved in or out of said volume, until the test results are within the required limits. The adjusting mechanism may then be fixed in a way which prevents or substantially prevents further adjustment.

In certain brake systems the rate of release of pressure at the end of a normal service brake application is increased through the use of a quick release valve. The same function can be provided by a valve embodying the present invention.

When the pressure is released rapidly from the supply port 11 the rate of pressure fall in the chamber 21 is much faster than the rate of pressure fall on the delivery side of the inner piston 22 because of the restricted flow through the hold seat 32/33. If the pressure ratio across the piston 22 exceeds a particular value than the piston 22 will move to open the dump seat 25/26 and allow a much faster release of pressure from the delivery port 13. However, the required rate of supplied pressure fall for this to occur may not be achieved in some brake systems because of the characteristics of the other valves in the system. In these circumstances a one-way restriction may be required to accentuate the difference across the piston and thereby cause the seat to open with a lower flow rate out of the supply port 1. This restriction must be positioned so as to not reduce the rate of pressure fall in the chamber 21.

An example of such a restriction is shown in FIGS. 10 and 11 of the drawings and comprises a shuttle valve 301 provided in association with the supply port 11.

When fluid is flowing into the supply port 11, the shuttle component 301a moves to the position shown in FIG. 10 and offers little resistance to fluid flow as the fluid flow around and outer edge 303 of the component 301a. The fluid can also flow into the central hole 31 of a stem 302 which is an extension of the inner piston 22.

Conversely, when fluid is flowing out the supply port 11 the shuttle valve moves to the position shown in FIG. 11 restricting the main flow around the outer edge 303 of the component 301a but allowing a small flow between an inner edge 304 of the component 301a and the stem 302. The flow rate out of the centre hole 31 is not restricted.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A valve assembly having a fluid switch and a main valve for controlling fluid pressure in a working volume in three control states wherein the main valve has a control chamber, a moveable valve member, and three ports for fluid, namely a first port being for connection to a source of pressurised fluid, a second port being for connection to volume of low pressure fluid, and a third port for connection to the working volume, the valve member being moveable between a build position in which the second port is substantially closed and the first port is connected to the third port, a hold position in which flow of fluid through the first, second, and third ports is substantially prevented, and an exhaust position in which flow of fluid through the first port is substantially prevented whilst the second port is connected to the third port, flow of fluid through the first port and the second port being controlled by the fluid switch being provided with an electrical signal in a first state or a second state respectively, and flow of fluid through the third port being controlled by alternating said signal between said first and second states, wherein the pressure supply to the fluid switch is drawn from the source of pressurized fluid thereby making the flow into the control chamber partly proportional to the supply pressure, and the valve assembly is configured such that if the fluid pressure in the control chamber exceeds a predetermined percentage at the first port, the valve member adopts the exhaust position.

2. A valve assembly according to claim 1 wherein the fluid is pneumatic fluid.

3. A valve assembly according to claim 1 wherein the fluid is hydraulic fluid.

4. A valve assembly according to claim 1 wherein the fluid switch comprises a two-position solenoid operated valve member.

5. A valve assembly according to claim 1 wherein the fluid switch comprises a two position piezoelectrically operated valve member.

6. A valve assembly according to claim 3 wherein the valve assembly is an ABS valve.

7. A valve assembly according to claim 1 wherein the valve assembly is an EBS valve.

8. A valve assembly according to claim 1 wherein the valve member moves to the build position when the electrical signal to the fluid switch is off for a continuous period.

9. A valve assembly according to claim 1 wherein the valve member moves to the exhaust position when the electrical signal to the fluid switch is on for a continuous period.

10. A valve assembly according to claim 1 wherein the valve member moves to the hold position when the electrical signal to the fluid switch is alternated between on and off such that the pressure in the control chamber of the valve remains within an intermediate range.

11. A valve assembly according to claim 1 wherein the valve is provided with ABS pressure control logic to control the fluid switch.

12. A valve assembly according to claim 1 wherein the valve is an ABS valve and the third port is a normally open hold port holding the pressure in a delivery to a brake operating means when the hold port is closed and the second port is a normally closed exhaust port for connecting the delivery to atmosphere or to another low pressure region when the exhaust port is open.

13. A valve assembly according to claim 1 wherein the valve is an ABS valve and the valve has a normally open hold seat for holding the pressure in a delivery to a brake operating means when the hold seat is closed and a normally closed exhaust seat for connecting the delivery to atmosphere or other low pressure region when the exhaust seat is open.

14. A valve assembly according to claim 1 wherein the valve member moves to the build position when the pressure in the control chamber is less than a predetermined percentage of the supply pressure, said predetermined pressure lying in a range of about 5% to about 50%.

15. A valve assembly according to claim 14, wherein the predetermined pressure is about 20%.

16. A valve assembly according to claim 1 wherein the valve member moves to the exhaust position when the pressure in the control chamber is greater than a predetermined percentage of the supply pressure, said predetermined pressure lying in a range of about 70% to about 95%.

17. A valve assembly according to claim 16, wherein the predetermined pressure is about 80%.

18. A valve assembly according to claim 1 wherein the hold pressure state is when a solenoid is switched on and off rapidly such that the pressure delivered in the control chamber is between two predetermined percentages of the supply pressure, said predetermined pressures being about 10% to about 90% of the supply pressure.

19. A valve assembly according to claim 18, wherein the valve member moves to the hold position when the pressure in the control chamber is about 50% of the pressure at the first port.

20. A valve assembly having an electrically operated fluid switch control device having two seats and a switch member movable alternatively into sealing engagement with the seats to place a main valve in a first control state by a control chamber of the main valve to a supply of fluid under pressure when the switch member is in a first position and in engagement with one seat and to place the valve in a second control state by connecting the control chamber to a low pressure region when the switch member is in a second position and in engagement with the other seat, a body of the main valve having a first chamber in which a first piston is mounted for movement under the influence of fluid pressure in the control chamber, a second piston movable in a second chamber provided in the first piston under the influence of fluid pressure in a supply port, the second piston being movable into engagement with a third seat provided on the first piston to control passage of fluid from a delivery to an exhaust and being movable into engagement with a fourth seat provided on said body to control passage of fluid from a supply to the delivery thereby placing the valve in a third control state and a control means to energise the fluid switch to position said switch member a. in said first position b. in said second position c. to alternate the position of the valve member between said first and second positions.

21. A valve assembly according to claim 20 wherein the internal dimensions of the valve are such that the valve enters each of the three control states depending upon the proportion of the supply pressure which is passed to the control volume.

22. A valve assembly according to claim 20 having an adjuster device for adjusting the volume of the control chamber.

23. A valve assembly according to claim 22 wherein the adjuster device comprises an adjuster piston moveable in an adjuster chamber which is connected to the control chamber whereby the volume of the control chamber may be modified by adjustment of the adjuster position in the adjustment chamber.

24. A valve assembly according to claim 20 wherein a device is provided to accentuate the pressure across the second piston.

25. A valve assembly according to claim 24 wherein the device comprises a shuttle or valve connected in functional association with the supply port to permit of a greater flow of fluid into the supply port than out of the supply port.

26. A valve assembly according to claim 25 wherein the shuttle valve comprises a valve member wherein, when the flow is into the supply port, the valve member occupies a position in which fluid may flow around the outside of the valve member whilst when the flow is out of the supply port the valve member may occupy a position in which flow of fluid around the outside of the valve member is restricted or is prevented.

* * * * *

UNITED STATES PATENT AND TRADEMARK OFFICE
CERTIFICATE OF CORRECTION

| | |
|---|---|
| PATENT NO. | : 7,147,006 B2 |
| APPLICATION NO. | : 10/822598 |
| DATED | : December 12, 2006 |
| INVENTOR(S) | : Edward Gilbert Shaw et al. |

It is certified that error appears in the above-identified patent and that said Letters Patent is hereby corrected as shown below:

On the title page, after item (22) insert (63)

--                                      Related U.S. Application Data:

Continuation of application No. PCT/GB02/04566 filed on 9 October 2002 --.

Signed and Sealed this

Twenty-seventh Day of March, 2007

JON W. DUDAS
*Director of the United States Patent and Trademark Office*